Patented Apr. 7, 1936

2,036,827

UNITED STATES PATENT OFFICE 2,036,827

ALKYL ETHERS OF 4-CHLORO RESORCINOL

Roland R. Read, Kirkwood, Mo., assignor to Lambert Pharmacal Company, Wilmington, Del., a corporation of Delaware No Drawing. Application November 23, 1933, Serial No. 699,405

6 Claims. (Cl. 260—150)

This invention relates to, and has for its purpose, the provision of certain new phenols which are nuclear chlorine substitution products of the mono alkyl ethers of resorcinol of the general formula $C_6H_3(OH)(OR)Cl$ wherein R is any alkyl group.

The substitution of chlorine in the nucleus of phenols is known to intensify or otherwise modify their germicidal and antiseptic activity as well as other therapeutic properties.

Among the many alkyl ethers of chloro resorcinol within the scope of this invention are the mono normal alkyl ethers, the mono secondary alkyl ethers, and mono alkyl ethers wherein the alkyl group is branched in configuration.

Mono-n-butyl chloro resorcinol may be prepared as described in the following example:

36 grams of 4-chloro resorcinol is added to a solution of 5.7 grams of sodium in 140 grams of alcohol. This solution is heated, with stirring, on a steam bath under a reflux condenser. 34 grams of n-butyl bromide is added over a period of one hour, whereupon sodium bromide separates out. The mixture is heated one hour longer, then allowed to stand over night. The alcohol is distilled off and the oil taken up in three volumes of toluene. The toluene solution is extracted with a 5% solution of caustic soda containing 15 grams of alkali and the aqueous extract acidified. The oil so freed is taken up in ether, this solution dried and the oily product obtained by fractional distillation. A clear, almost colorless, limpid oil is obtained boiling at 128—130° C. at 1 mm.

Other mono-alkyl ethers of chloro resorcinol may be prepared by the same procedure with the substitution of the bromide of the desired alkyl group for the butyl bromide: for example, amyl bromide to prepare the amyl ether or octyl bromide to prepare the octyl ether. More particularly, mono-n-hexyl ether of 4-chloro resorcinol is obtained by substituting 41.5 grams of n-hexyl bromide for the butyl bromide in the foregoing example.

It is understood that the invention is not limited, for example, to the exact relative amounts or sequence of mixing of reactants. For instance, an excess of an alkyl halide may be used or an excess of chloro resorcinol, which excess is removed by later purification; aqueous or aqueous alcohol solutions of sodium hydroxide may also be employed. The mono-alkyl ether of resorcinol may be prepared first and subsequently chlorinated, as for example, by the action of sulphuryl chloride.

These phenols are characterized by particularly high germicidal and antiseptic activity. Aqueous solutions are valuable for these purposes, as are also solutions in water soluble solvents or in aqueous solutions of such solvents. Solutions in oils or fats, whether animal or vegetable, are valuable where it is desired to delay absorption or minimize the more rapid action of solutions in water soluble solvents. These phenols have also therapeutic value as components of dusting powders, ointments, or water soluble jellies.

This invention is not limited to highly purified phenols of the character described, but embraces such phenols in a less pure state since the latter within certain limits possess the therapeutic values which I have ascribed to the former.

I claim:

1. Ethers of 4-chloro resorcinol having the general formula $C_6H_3(OH)(OR)Cl$ where R is an alkyl group having more than three carbon atoms.

2. Ethers of 4-chloro resorcinol having the general formula $C_6H_3(OH)(OR)Cl$ where R is an alkyl group normal in configuration and containing more than three carbon atoms.

3. Ethers of 4-chloro resorcinol having the general formula $C_6H_3(OH)(OR)Cl$ where R is an alkyl group secondary in configuration and containing more than three carbon atoms.

4. Ethers of 4-chloro resorcinol having the general formula $C_6H_3(OH)(OR)Cl$ where R is an alkyl group branched in configuration and containing more than three carbon atoms.

5. A new product, mono-n-hexyl ether of 4-chloro resorcinol having the formula $C_6H_3(OH)(OC_6H_{13})Cl$.

6. A new product, mono-n-hexyl ether of 4-chloro resorcinol, being an oil boiling at substantially 152–162° C. at 2 mm.

ROLAND R. READ.